(12) United States Patent
Kalkunte et al.

(10) Patent No.: US 9,716,641 B2
(45) Date of Patent: Jul. 25, 2017

(54) ADAPTIVE INDUSTRIAL ETHERNET (71) Applicant: Avago Technologies General IP (Singapore) PTE. LTD., Singapore (SG)

(72) Inventors: Mohan Venkatachar Kalkunte, Saratoga, CA (US); Wael William Diab, San Francisco, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 96 days.

(21) Appl. No.: 14/447,215

(22) Filed: Jul. 30, 2014

(65) Prior Publication Data

US 2015/0081887 A1 Mar. 19, 2015

Related U.S. Application Data

(60) Provisional application No. 61/911,866, filed on Dec. 4, 2013, provisional application No. 61/880,035, filed on Sep. 19, 2013.

(51) Int. Cl.
*H04L 12/26* (2006.01)
*H04L 12/24* (2006.01)

(52) U.S. Cl.
CPC ........ *H04L 43/0852* (2013.01); *H04L 41/044* (2013.01); *H04L 41/0816* (2013.01); *H04L 41/12* (2013.01); *H04L 41/22* (2013.01)

(58) Field of Classification Search
CPC ... H04L 41/0816; H04L 41/044; H04L 41/12; H04L 41/22; H04L 41/022; H04L 43/0852; H04L 43/0876; H04L 63/065

USPC .................................................. 709/223, 224
See application file for complete search history.

(56) References Cited

U.S. PATENT DOCUMENTS

| | | | |
|---|---|---|---|
| 7,653,700 B1 * | 1/2010 | Bahl | H04L 12/2602 709/216 |
| 2003/0147386 A1 * | 8/2003 | Zhang | H04L 12/185 370/390 |
| 2003/0216143 A1 * | 11/2003 | Roese | G01S 5/02 455/456.1 |
| 2005/0060406 A1 * | 3/2005 | Zhang | H04L 12/2602 709/225 |
| 2009/0172179 A1 * | 7/2009 | Miao | H04L 65/602 709/231 |
| 2009/0213754 A1 * | 8/2009 | Melamed | G06F 9/546 370/254 |
| 2009/0303902 A1 * | 12/2009 | Liu | H04L 12/189 370/254 |
| 2015/0127733 A1 * | 5/2015 | Ding | H04W 4/08 709/204 |

* cited by examiner

*Primary Examiner* — Ruolei Zong
(74) *Attorney, Agent, or Firm* — Oblon, McClelland, Maier & Neustadt, L.L.P.

(57) ABSTRACT

A system may include equipment divided into control groups. Each control group may be assigned a supervisor node. A server computer may communicate with the equipment in a control group via the supervisor node associated with that control group. The server computer may store a profile of the equipment. The profile may contain physical locations of the equipment, settings of the equipment, components of the control groups, and the association of supervisor nodes with the control groups. A display unit may display the profile of the plurality of the equipment as an overlay of the physical locations of the plurality of equipment on a map.

20 Claims, 5 Drawing Sheets

ADAPTIVE INDUSTRIAL ETHERNET

CROSS REFERENCE TO RELATED APPLICATIONS

This application claims priority to provisional application Ser. No. 61/911,866, filed Dec. 4, 2013, and provisional application Ser. No. 61/880,035, filed Sep. 19, 2013, both of which are incorporated by reference in their entirety.

TECHNICAL FIELD

This disclosure relates to communication in an industrial environment. This disclosure also relates to adapting communications to operations in the industrial environment.

BACKGROUND

Rapid advances in sensors, control systems, and manufacturing techniques have led to the worldwide adoption of automated manufacturing techniques for every imaginable product. The manufacturing techniques include automation and process control, and operate over an extreme range of temperature, vibration, electrical and acoustic noise, humidity, and other environmental characteristics. Multiple types of sensors monitor the manufacturing techniques and are connected with each other and to one or more central server computers and data centers for operation. Use of standard Ethernet protocols with rugged connectors and extended temperature switches in an industrial environment, for automation or process control is typically referred to as Industrial Ethernet (IE).

DETAILED DESCRIPTION

An environment, such as an industrial environment, is described. The environment may include multiple devices and the environment may be sensed by multiple sensors and connected via an Industrial Ethernet (IE). The multiple devices may be controlled by PLC/RTU control units which may be switches or routers with programmable logic for the devices embedded. A central monitoring service may monitor and record locations and operations of the devices in the environment. A proven configuration of the environment may be saved and restored to support flexible manufacturing. The configuration of the environment may be displayed for manual review analysis. An automatic analysis of the configuration may also be provided. The central monitoring service may also determine operation patterns in the environment and predictively configure equipment in the environment in response to occurrence of an event. The equipment may be given a rating displayed and used for review.

Figure 1:
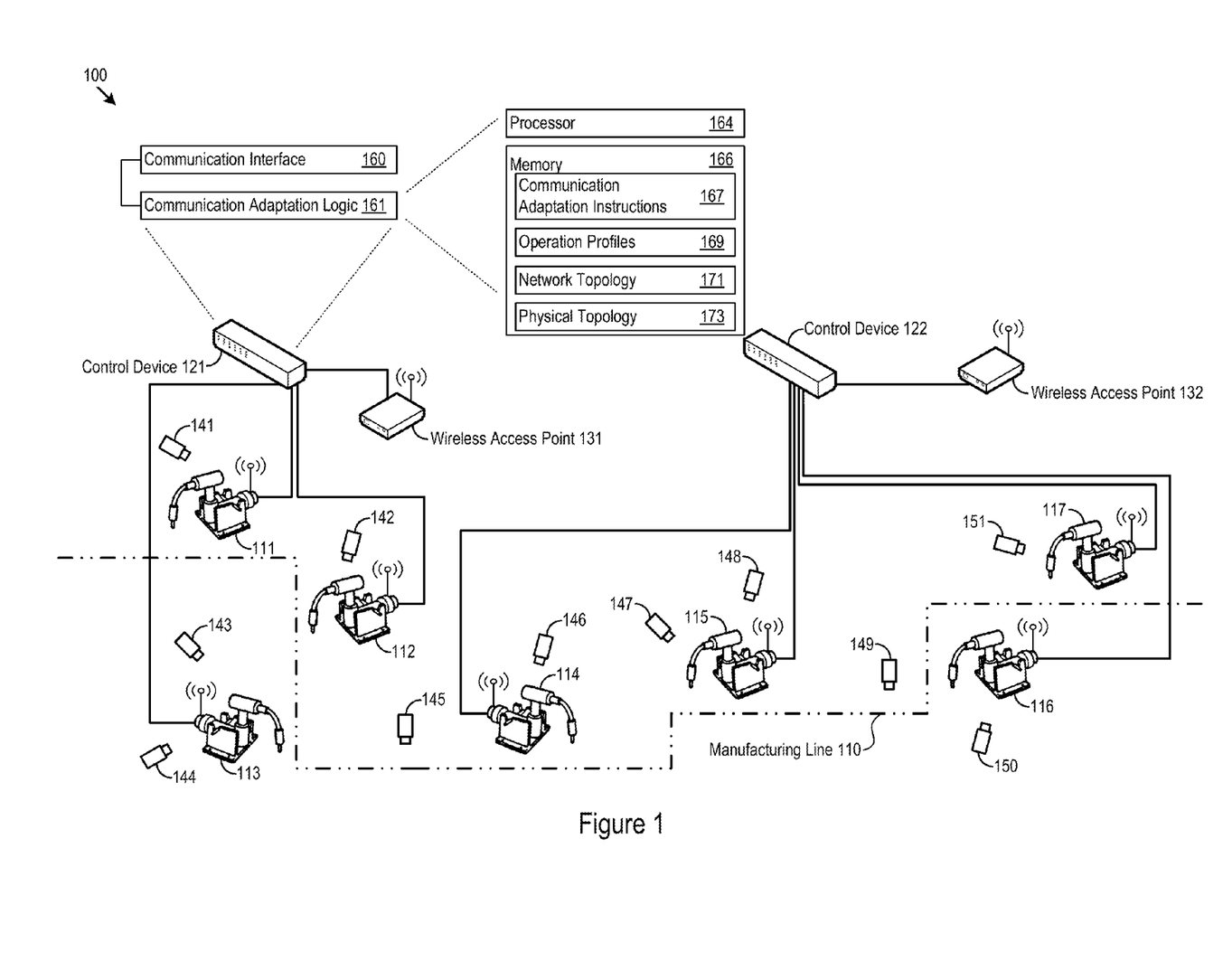
FIG. 1 shows an example of an environment sensed by multiple sensors.

The discussion below makes reference to FIG. 1 which shows an example of an environment 100 sensed by multiple sensors and connected via an Industrial Ethernet (IE). The environment may be any environment, such as a manufacturing process line, an industrial materials processing plant, or an factory inventory area. In particular, the environment 100 shown in FIG. 1 is an industrial environment that includes the manufacturing line 110. The environment 100 is not limited to industrial settings, however, and any environment in which the communication adaptations discussed below might be useful is a possibility, such as within a vehicle, a hospital, television broadcasting studio, or a classroom.

The environment 100 may include any number of devices. The exemplary industrial environment 100 in FIG. 1 includes manufacturing devices 111-117, control devices 121 and 122, wireless access points (AP) 131 and 132, and multiple sensors labeled as sensors 141-151. Additional or alternative devices may be present in the industrial environment 100, including as examples, network devices such as hubs, switches, routers, or bridges, data servers, actuators, generators, motors, machinery, monitoring devices, computers, management or control systems, environment management devices, analysis systems, communication devices, and any mobile device such as a mobile phone, tablet, and the like.

The manufacturing devices 111-117 may be positioned along the manufacturing line 110. The manufacturing devices 111-117 may be implemented as any machinery, robotics, tooling, or other electronics that participate in an assembly (or de-assembly) process along the manufacturing line 110. The manufacturing devices 111-117 may also be referred to as intelligent electronic devices (IEDs), industrial equipment, or simply, as equipment. The manufacturing devices 111-117 may be communicatively linked to control devices, through which the manufacturing devices 111-117 receive control signals that monitor, guide, or control the manufacturing devices 111-117. In FIG. 1, the control device 121 is communicatively linked to the manufacturing devices 111-113 and the control device 122 is communicatively linked to the manufacturing devices 114-117. In such a configuration, the control device 121 may be referred to as a supervisor node of a control group including manufacturing devices 111-113, and the control device 122 may be referred to as a supervisor node of control group of the manufacturing devices 114-117. In some variations, the control device 121 may be a programmable logic controller (PLC). The control device 121 may be a network switch or a network router with programmable logic embedded in the control device 121.

The sensors 141-151 may monitor various locations in the industrial environment 100. In FIG. 1, the sensors 141-151 are positioned at predetermined monitoring locations along the manufacturing line 110 and proximate to the manufacturing devices 111-117. The sensors 141-151 may capture environment data for monitoring the environment 100, such as visual data, audio data, temperature data, positional or movement data, or any other environment data indicative of a characteristic of the industrial environment 100. The sensors 141-151 may communicate captured data to any device in the industrial environment 100, an analysis system, or a monitoring system. The control devices 121 and 122 may store the locations of the sensors 141-151 and the manufacturing devices 111-117. In one example, the control device 121 may only store locations related to the equipment which belong to the control group being supervised by the control device 121. For instance, in the exemplary environment of FIG. 1, the control device 121 may store location of manufacturing devices 111-113 and corresponding sensors 141-144.

The industrial environment 100 may support multiple communication links between any of the equipment within and/or outside the industrial environment 100. The multiple communication links may provide redundancy or failover capabilities between the communicating devices. As one such example shown in FIG. 1, the control device 121 is linked to the manufacturing device 111 through both a wired communication path (e.g., through a wired cable) and a wireless communication path (e.g., via the wireless access point 131). The manufacturing devices 111-117, in that regard, may communicate across multiple technologies, including any number of wired technologies and/or wireless technologies. Adapting network communications in the IE according to operation of the IE may lead to efficiencies in the operation.

The equipment in the industrial environment 100 may include circuitry in the form of a communication interface that supports multiple communication links with other equipment within or outside of the industrial environment 100. A communication interface may be configured to communicate according to one or more communication modes, e.g., according to various communication techniques, standards, protocols, or across various networks or topologies. The communication interface may support communication according to particular quality-of-service (QoS) techniques, encoding formats, through various physical (PHY) interfaces, and more. For example, a communication interface may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM® Association, Long Term Evolution (LTE)™, or more), WiFi (including 802.11 a/b/g/n/ac), WiMAX, Bluetooth, WiGig (e.g., 802.11ad), and any other wired or wireless technology or protocol. The control device 121, as one example, includes the communication interface 160.

The equipment in the environment 100 may include communication adaptation logic for adapting communications in the environment 100. In FIG. 1, the control device 121 includes the communication adaptation logic 161. The communication adaptation logic 161 may be implemented as circuitry involving hardware, and software. The communication adaptation logic 161 may be implemented, for example, in a system on a chip (SoC), application specific integrated circuit (ASIC), or other circuitry in the control device 121. In some implementations, the communication adaptation logic 161 may involve circuitry operable to perform various functions. The circuitry may include one or more processors 164 and memories 166. The memory 166 may store, for example, communication adaptation instructions 167 (e.g., program instructions) that the processor 164 may execute to carry out any of the adaptation features described below. The memory 166 may also store operation profiles 169, a network topology 171, and a physical topology 173 among other information that may be stored on the memory 166.

The operation profiles 169 may specify particular communication parameters or configurations of the equipment in the industrial environment 100. An operation profile may include location and settings of each of the equipment. The settings of the equipment may include hardware and/or software settings of the equipment. In addition, the operation profile may include an association between the equipment and one or more control groups, and association between the one or more control groups and the respective supervisor nodes.

The network topology 171 may provide network interconnectivity of the environment 100 in the form of a spanning tree or a routing table. The network interconnectivity may be automatically generated via packet sniffing of content (or examining tags) of control signals sent to the equipment. The spanning tree or the routing table may be adapted, according to the adaptation logic 161, to incorporate information gathered during packet sniffing (or tag examination). For example, timing information associated with pathways within the spanning tree or the routing table may be added to each entry in the spanning tree or the routing table. With such an industrial routing tree infrastructure, it may be possible to (i) dynamically change rates, (ii) actively drop paths that come through, and (iii) maintain an overall network topology map while meeting the underlying control group requirements.

The physical topology 173 may provide the physical locations of the equipment, i.e. the manufacturing devices 111-117, the sensors 141-151, the control devices 121-122, and the APs 131-132. The locations of the equipment may be obtained directly from the respective equipment or indirectly via an external device. To obtain the location of any equipment directly, the equipment may include a location sensing devices, such as a global-positioning system (GPS), gyroscopes and other such devices capable to determine a location and/or orientation of the equipment. Alternatively, or in addition, a location may be indirectly associated with the equipment by the external device. The external device may include the location sensing devices described earlier. The external device may be placed in proximity to the equipment, i.e. any of the manufacturing devices 111-117 or the sensors 141-150, and the location sensed by the external device may be associated with the corresponding equipment. The external device may be a tablet, smartphone, or any other device equipped with location sensing devices. The physical topology 173 may be used for visual presentations to network administrators and for manual and/or automatic provisioning, control regrouping, and identifying control group timing expectations and margins. The physical topology 173 may also be useful for readjustment of operational modes of sensors, manufacturing devices, and control devices. Further yet, the physical topology 173 may be utilized to suggest network node redeployment/additions and identify optimum locations of control logic in the network. In another example, the physical topology 173 may be used to determine location of all manufacturing devices, networking equipment, PLCs, sensors, on an industrial floor space.

Once set up, and proven to work, the network and physical topologies 171 and 173 may be saved as part of an operation profile. The saved operation profile may be easily restored to support flexible manufacturing configurations. Based on the saved physical topology map, workers can rearrange equipment to precise locations and automatically restore a known network topology.

Figure 2:
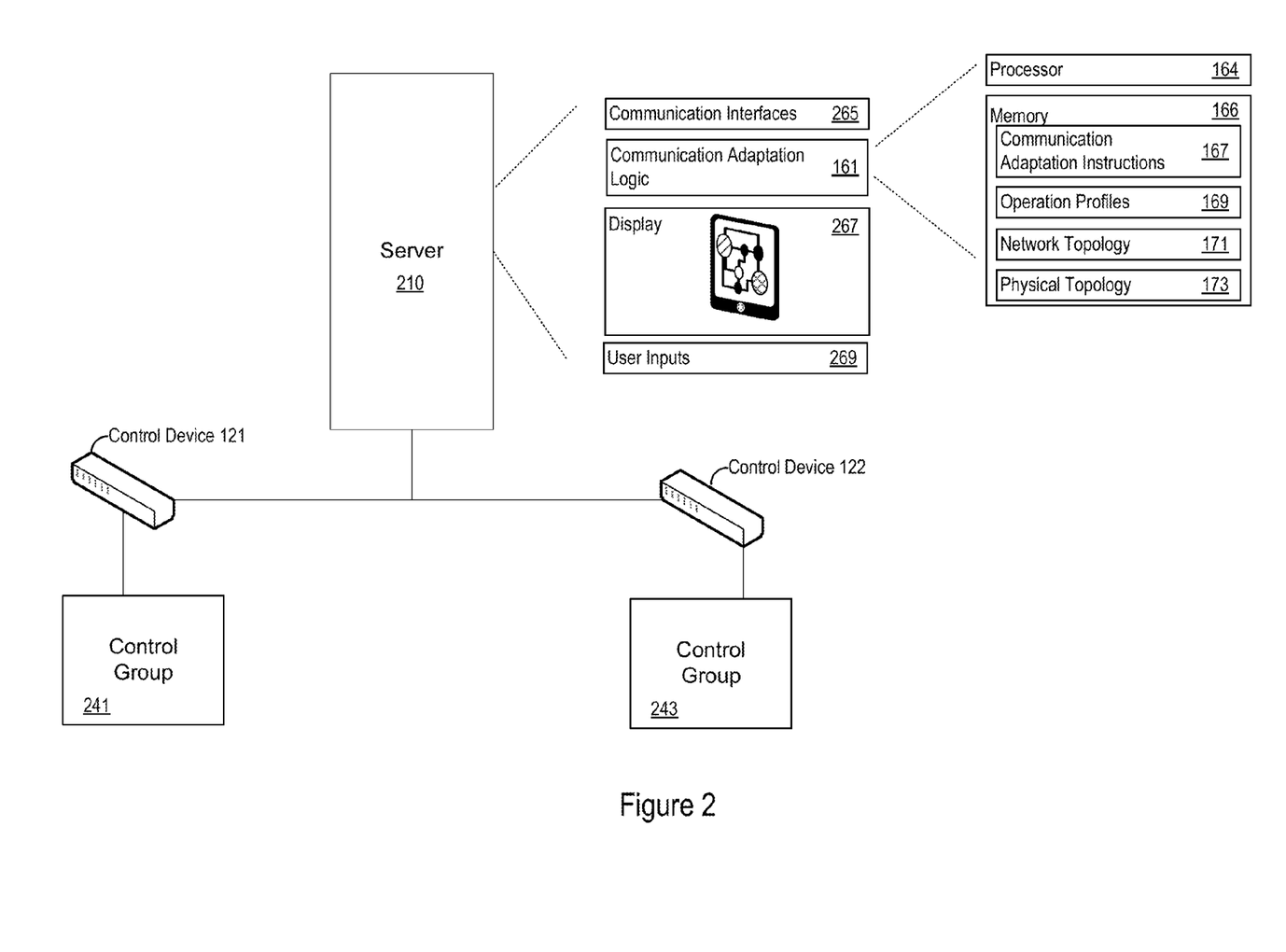
FIG. 2 shows another example of an environment sensed by multiple sensors.

Alternatively, or in addition, one or more server computers, also referred to as servers, may be responsible for the communication adaptation logic 161. A server may involve circuitry which may include one or more processors, one or more memory devices, one or more communication interfaces and other structured circuitry. The processors may execute computer executable instructions stored on the memory devices. Alternatively, or in addition, the processors may execute computer executable instruction accessible via the communication interfaces. As shown in FIG. 2, a server 210 may be in communication with the control devices 121-122. FIG. 2 depicts the equipment of the industrial equipment 100 as control groups 241 and 243. As described earlier, the control device 121 may be the supervisor node of the control group 241 including manufacturing devices 111-113, and the control device 122 may be the supervisor node of the control group 243 of the manufacturing devices 114-117. Further, the sensors 141-144 may be part of the control group 241 while the sensors 145-151 may be a part of the control group 243. Thus, the server 210 may transmit control signals to the equipment in the control groups 241 and 243 via the control devices 121 and 122 respectively. Communication interfaces 265 may allow the server 210 to communicate with other devices. The server 210 may further include a display 267. Further, user inputs 269, such as a keyboard, mouse, voice recognition, touchscreen, and any other type of input mechanisms may provide a technician capability to interact with the server 210

A user interface, for example, a graphical user interface (GUI), may be displayed on the display 267. The GUI may display the physical topology 173 and overlay the interconnectivity among the equipment as indicated by the network topology 171. An industrial floor plan map may be an underlay with the physical topology 173 and network topology 171 in one or more layers on top thereof. The GUI may thus visualize sensor locations, machine ownership (i.e. association between sensors and manufacturing devices), control pathways, manufacturing devices, robots, workers, PLC/RTU/PAC units, controlled elements, and any other equipment on the floor plan. Through manual and/or automatic topology analysis, redundancy opportunities may be identified. Routing information/tables and spanning tree information may be adapted to reflect such redundancies along with associated cross port duties (queuing, comparisons, etc.) to enable visualizing such redundancies.

The technician may review and/or analyze the configuration of the environment 100 via the GUI. The technician may further reconfigure the layout of the industrial environment 100 by altering the physical topology 173 or the network topology 171 displayed in the GUI using the user inputs 269. The server 210 may simulate a reconfigured layout. The GUI may indicate a rating associated with the equipment in the original as well as the altered layout. The rating may be indicated, for example as a string of characters. In another example, the rating may be represented using color codes, or any other visual indication or a combination of such visual indicators. Alternatively, or in addition, the GUI may indicate latency associated with a communication path between two equipment. For example, for the industrial environment of 100, the GUI may indicate a communication path between the control device 121 and the manufacturing device 113 having lower latency (i.e. faster communication) than a communication path between the control device 121 and the manufacturing device 112. The GUI may indicate such latency by varying colors used for displaying the communication paths, such as green for fast and red for slower communication paths. In another example, the GUI may indicate such latency by varying thickness of lines used to display the communication paths. Several other techniques or a combination of such techniques may be applied to indicate the latency in the GUI. Thus, the GUI may allow a user, such as the technician, to visualize and analyze the industrial environment, such as 100, and identify areas of the industrial environment that may need further analysis by provision of ratings and color codes of the equipment. The user may proceed with the further analysis by zooming in to the identified areas and reconfiguring the industrial environment as may be required. The user may further simulate possible configurations of the industrial environment to determine an optimum configuration.

Alternatively, or in addition, the communication adaptation logic 161 may analyze the industrial environment 100 automatically. The analysis may involve analyzing the physical topology 173 overlaid with the network topology 171 to identify redundancies. For example, the communication adaptation logic 161 may identify a communication path between a pair of equipment with latency higher than a predetermined threshold. In response, a replacement communication path may be identified between the pair of equipment such that the replacement communication path has a latency lower than the predetermined threshold. The replacement path may ensure compliance with settings for a mission critical industrial network, where the predetermined threshold is part of the settings. A part of the industrial network may be mission critical, if that part is integral to the operation of the industrial network. Alternatively, or in addition, the mission critical part of the network may have a different set of boundary conditions than the rest of the industrial network, and non-compliance with the boundary conditions may be deemed as a failure, such as a catastrophic failure. The boundary conditions may involve threshold values for various network parameters such as latency, message length, network reliability and other such parameters. The communication adaptation logic 161 may identify the replacement communication path utilizing the physical topology 173. In addition, the communication adaptation logic 161 may use the network topology 171 to determine the replacement communication path. The replacement communication path may be a shortest path between the pair of equipment. The latency of a communication path may be determined and recorded by the communication adaptation logic 161 by monitoring the continuous traffic of data (and/or control signal) packets among the various equipment. Alternatively, or in addition, the communication adaptation logic 161 may determine the latency to particular equipment by monitoring time required to transmit and/or receive a test packet to and/or from the particular equipment. The communication adaptation logic 161 may store the determined latency as part of a record, or entry of the spanning tree stored in the memory 166. For example, an entry corresponding to a communication path in the network, may contain latency information associated with the communication path.

Alternatively, or in addition, the communication adaptation logic 161 may monitor status of the equipment, to determine as whether the equipment is about to fail or has failed. The status may be monitored by a periodic status check message. The communication adaptation logic 161 may transmit a status check request message to the equipment and in response receive a status of the equipment from the equipment. Alternatively, or in addition, the equipment, via the PLC, may register with the communication adaptation logic 161 and periodically report the status to the communication adaptation logic 161. Such registration may be performed during initiation of the equipment. At registration, the equipment may indicate characteristics and requirements of the equipment. Such characteristics may include operation modes of the equipment. More desirable or less desirable operational modes may be indicated implying a device failure in case the equipment is operating in a less desirable mode of operation. The equipment, at registration, may also indicate requirements such as latency and/or bandwidth requirements. The communication adaptation logic 161 may monitor the data transfer among the equipment of the industrial environment 100 and determine if the characteristics and requirements indicated by the equipment are being met. If required, the communication adaptation logic 161 may select operational modes for any of the equipment to satisfy such requirements. Such selections may be stored within a database in the memory 166. During operation, particular equipment, such as the control device 121, or the manufacturing device 113, or the sensor 142 may identify a state demanding a change in priority and in turn may request the communication adaptation logic 161 to select an upgraded or downgraded operational mode for the particular equipment. The communication adaptation logic 161 may, in response, reject the request, offer an alternative, or honor the request depending on the impact on the overall network performance. In addition, having access to the information of the equipment obtained at registration, involving timing, throughput and loading information associated with network/communication paths, the communication adaptation logic 161 may provide guidance for supplementing/rearranging/upgrading underlying resources of the equipment.

Figure 3:
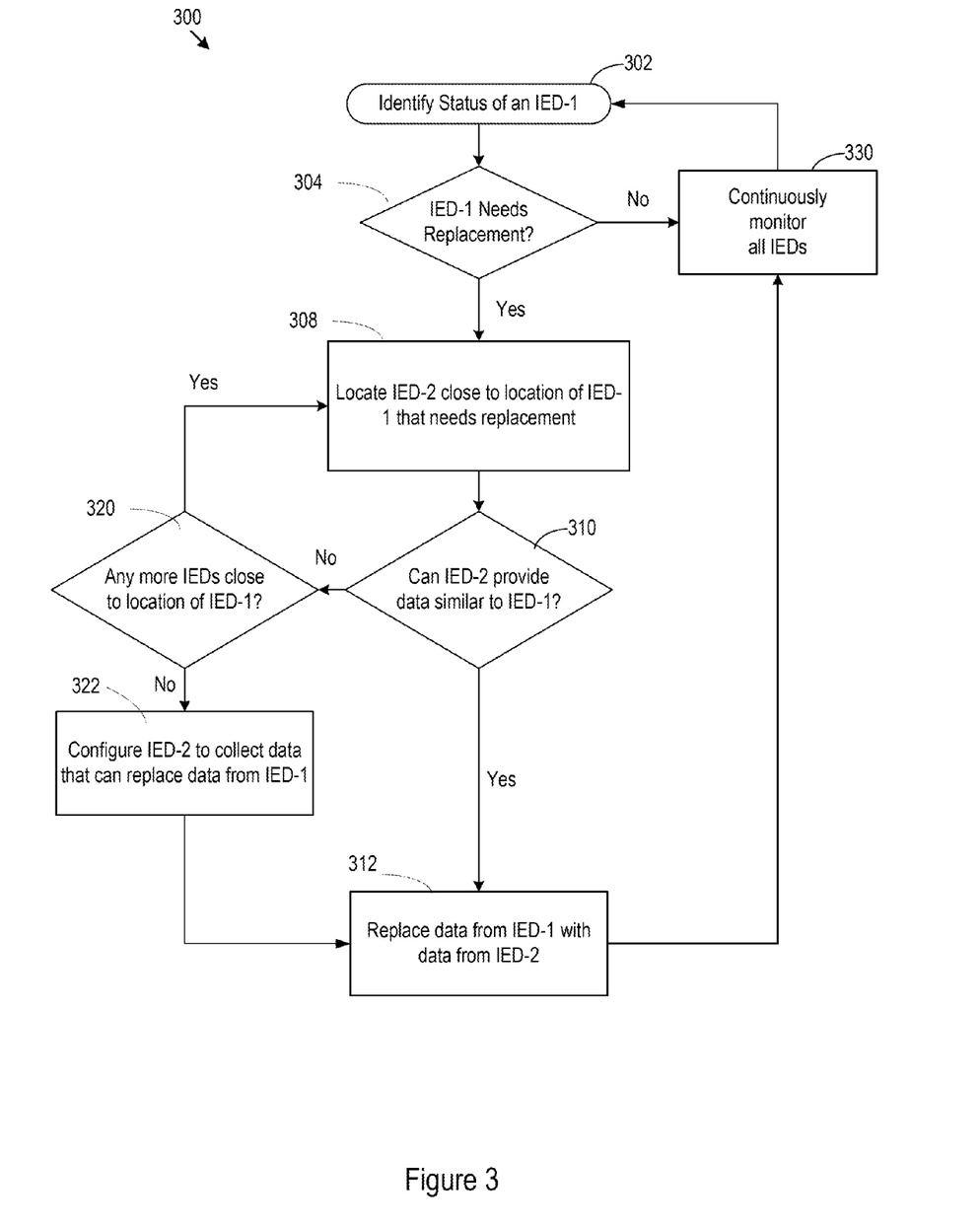
FIG. 3 shows a flowchart of example steps that may be performed to substitute one device with another in an example system.

Further yet, the communication adaptation logic 161 may identify particular equipment which may be replaced by another equipment. For example, in the industrial environment 100 of FIG. 1, the sensor 148 may be used instead of the sensor 147. FIG. 3 provides a flowchart 300 of example steps that may be performed for such a replacement. The sensor 147 may indicate a failure, or the communication adaptation logic 161 may identify the failure of the sensor 147 (302, 304). The communication adaptation logic 161 may identify another sensor, 148, in proximity of the sensor 147 (308). The communication adaptation logic 161 may utilize the location information in the physical topology 173 to identify the sensor 148. The communication adaptation logic 161 may rely on sensor information received from 148 instead of the sensor information received from the sensor 147 (312). The communication adaptation logic 161 may configure the sensor 148 to capture the information that the sensor 147 was configured to capture, in addition, to the information that the sensor 148 was already capturing (322). The communication adaptation logic 161 may also determine additional sensors in proximity of the sensor 147 (320) to identify the best replacement sensor. The communication adaptation logic 161 may continuously check status of the entire industrial environment 100 in such a manner (330).

The communication adaptation logic 161 may further utilize the network topology 171 and the physical topology 173 to provide a flexible industrial environment configuration by recognizing and identifying repetitive and cyclic behaviors. By continuously monitoring the actual performance of the industrial environment 100, the communication adaptation logic 161 may determine patterns of operations in the industrial environment 100 that occur frequently and predict an operation that may occur in a short time. Thus, the communication adaptation logic 161 may recognize that due to the nature of a manufacturing environment, communications upstream in a manufacturing process will often be followed shortly thereafter with other communications downstream. Such prediction might involve detecting signaling relationships and subsequent communications and control/supportive processing demands. Based on such prediction, the communication adaptation logic 161 may reprovision/reconfigure the industrial environment 100 to best fit the underlying demands in advance of their needs. Such prediction may extend beyond sourcing and packet marks/tags to actual underlying packet content. For example, referring to the FIG. 1, the communication adaptation logic 161 may be identify a pattern of operation in which the manufacturing device 115 receives a control signal X after a particular time interval T after the manufacturing device 113 receives a control signal Y. In order for the manufacturing device 115 to meet requirements such as the requirements that the manufacturing device 115 may have indicated at the time of registration with the communication adaptation logic 161, or control group timing of the manufacturing device 115, the communication adaptation logic 161 may reconfigure manufacturing device 115 in advance for operating as per control signal X.

Thus, configuration of the equipment in the industrial environment 100 may be tuned and retuned to meet demands of a changing manufacturing environment based on a reactive process and/or predictive process. In other words, based on one or more events at a front of a manufacturing line a second event may be predicted within a certain time window at the end of the manufacturing line. In manufacturing environments where the control signals X and Y occur once over a day, followed by falling back to the original configuration/provisioning thereafter, the predictive and/or reactive process may configure the control devices in the network topology to provide better efficiency. Thus, the control devices may be configured for the operations which occur for a majority portion of a day with predictive reconfiguration on occurrence of an upstream event. Such a predictive and/or reactive process may be used in environments other than an industrial environment. For example, in a network where non-video data packets are a majority, when a few video packets happen to be detected, the communication adaptation logic 161 may setup the related equipment, such as switches and/or routers, for a temporary burst delivery configuration.

Based on the continuous monitoring, the communication adaptation logic 161 may provide a rating and feedback system associated with industrial networking control tasks which reveal network strain beyond typical communication bottlenecks and extending to control related performance. The rating of particular equipment may represent performance level of the particular equipment in comparison to a capability or limit that may be set for the particular equipment at the time of registration of the particular equipment. The rating may be an indication of latency to receive data and/or control signals. In addition, the rating may indicate a turn-around time of the particular equipment in response to receipt of a data and/or control signal. The rating may be scaled; for example the equipment rating may be scaled such that 100 represents an optimum performance level and 0 represents equipment that has been switched off or in a failure state. Other scales may be used.

The continuous monitoring may also enable determining health of the overall system. For example, if performance level of any equipment in the system deteriorates, a message, such as a warning message, may be output or displayed. In example systems involving sensors, information collected by the sensors may be additionally used to determine the health of the system. Alternatively, or in addition, warnings or operational parameters of the equipment may also be monitored and integrated in the health monitoring. For example, fluid levels, battery charge levels, and other such operational parameters may be monitored and corresponding messages may be output or displayed, such as a warning message indicating a low battery charge detected at an equipment.

During operation of the industrial environment 100, the rating of particular equipment may vary based on varying demand of the particular equipment. For example, the manufacturing device 116 may be in high demand from 9 AM to 10 AM on Tuesdays. This may cause large amounts of network traffic to and from the manufacturing device 116 and corresponding sensors 149 and 150 during that time window. This may cause the rating of the equipment involved in the network traffic, such as the manufacturing device 116, the sensors 149 and 150, the control device 122, and the AP 132, to drop. For example the rating of the manufacturing device 116 may be 99 at all other times, but 66 during the 9 AM to 10 AM time window on Tuesdays. The communication adaptation logic 161 may reconfigure the involved equipment to maintain the rating associated with the involved equipment. Alternatively, or in addition, the involved equipment may be reconfigured so as to meet requirements of the industrial environment 100. For example, the industrial environment 100 may demand that the manufacturing device 116 receive a particular control signal within a determined timeframe. In another example, the industrial environment 100 may additionally demand that at least one of the sensors 149 and 150 upload their respective sensor information within a particular timeframe upon receipt of the particular control signal at the manufacturing device 116.

Figure 4:
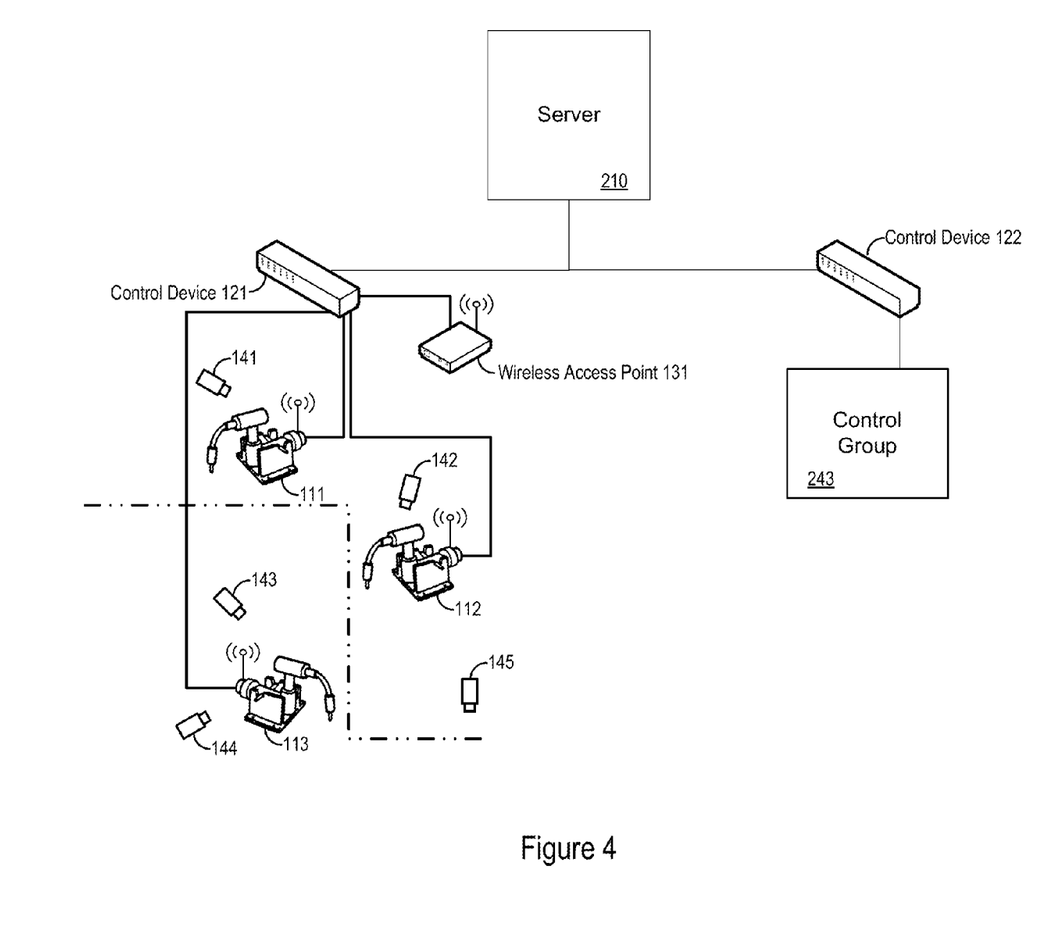
FIG. 4 shows another view of an example environment sensed by multiple sensors.

Further, based on the rating of individual equipment, the rating and feedback system may calculate an overall network rating for the network topology 171. Similarly, rating for the control groups 241 and 243 may be calculated based on the ratings of the components of the respective control groups. The corresponding ratings may be visualized in the GUI depending on the zoom level employed by the GUI. For example, a user, such as the technician, may display the industrial environment 100 at a very high level. This may cause the display 267 to display a consolidated view of the equipment in the industrial environment 100. For example, such a consolidated view may be such as that in FIG. 2, where the control groups 241 and 243 may be displayed without details of the components of the respective control groups. The ratings associated with the control groups 241 and 243 may be indicated in the GUI, either by displaying the ratings as strings, or using color codes or any other visualization technique. The user may request a further detailed view using the user inputs 269, such as by double clicking on the control group 241. This may result in a view of the industrial environment 100 as depicted in FIG. 4 with control group 241 expanded. The GUI may now indicate the ratings associated with each of the manufacturing devices 111-114 and the sensors 141-145, instead of the ratings associated with the control group 241. The GUI may provide further functionality to request standard deviations, averages, outliers, and any other calculations be performed on the ratings and indicate results of such calculations on the displayed GUI. Based on such ratings and/or calculation results, the communication adaptation logic 161 or a network administrator may identify, upgrade, supplementing, decommissioning, and/or recommissioning needs of the equipment. Further, based on such ratings and calculation results the logic 161 or the network administrator may select different configurations for the equipment permanently or within certain time periods. For example, continuing the earlier example of manufacturing device 116 above, the communication adaptation logic 161 may save and restore an operation profile for the manufacturing device for the time window between 9 AM to 10 AM every Tuesday.

Figure 5:
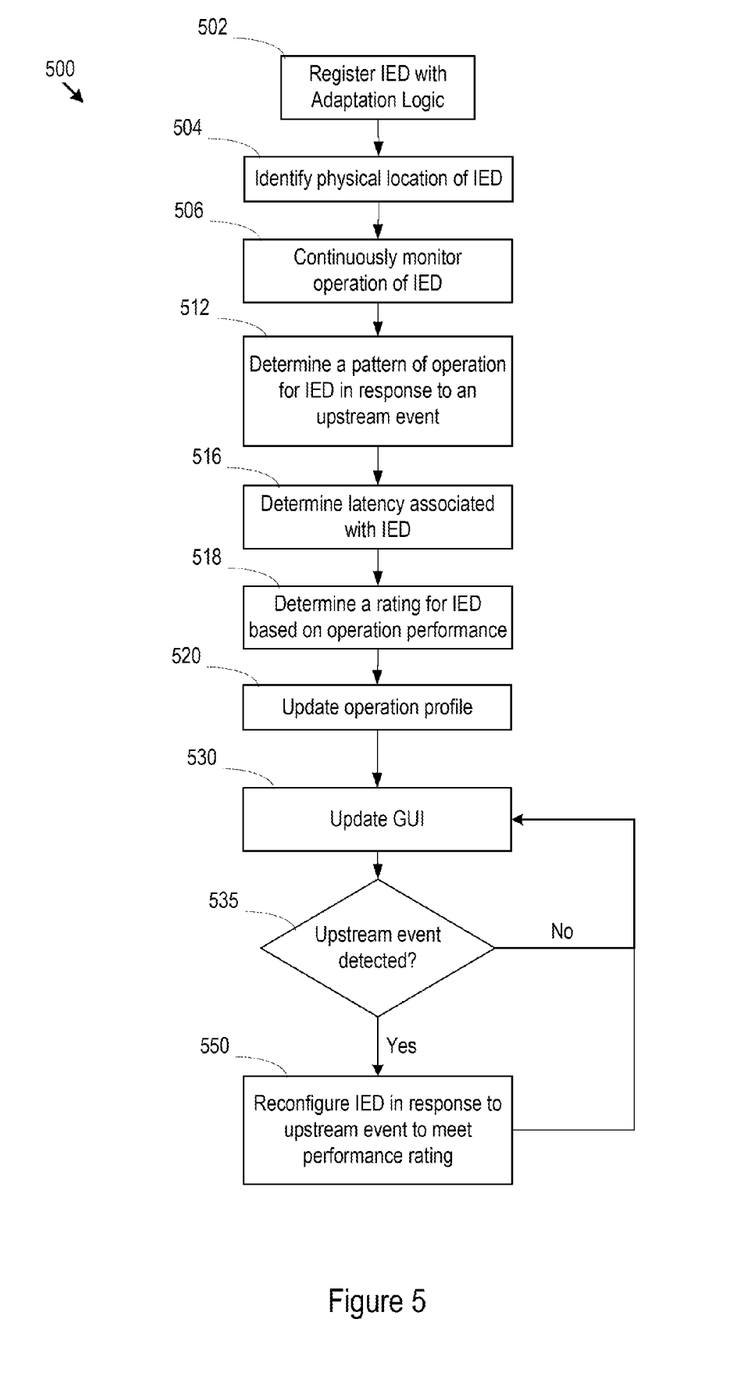
FIG. 5 shows a flowchart of example steps performed by an example system.

Steps performed by an example of the system are depicted in a flowchart 500 in FIG. 5. An intelligent electronic device (IED), manufacturing device, sensor, or any other equipment as described earlier, may register with a communication adaptation logic, such as the communication adaptation logic 161 (502). A physical location of the IED may be obtained and associated with the IED (504). The communication adaptation logic 161 may continuously monitor operation of the IED (506). Based on the monitoring, a pattern of operation of the IED may be identified (512). The pattern may involve cyclic or repetitive demands at a localized level or at an overall system level such as an upstream control signal triggering a time delayed response with sensor data uploads related to the downstream IED. Such sensor data uploads may require pre-processing support at the IED. A latency associated with data communication to and from the IED may be determined (516). Further, based on the monitoring of the operation of the IED, a rating may be associated with the IED (518). The communication adaptation logic 161 may be aware of performance requirements associated with the network. An operation profile containing the location information, network paths, latency information, performance related requirements and information, hardware and/or software settings of the IED and any other relevant information may be updated (520). A graphical user interface (GUI) displaying the overall system at a requested zoom (i.e. detail) level may be updated to represent such information (530). The communication adaptation logic 161 may continuously monitor the system and may detect the upstream control signal (535). To satisfy performance requirements and/or to maintain the performance rating of the IED, the communication adaptation logic 161 may tune the IED in response (550). The system may update the GUI accordingly (530).

In another example system, the communication adaptation logic 161 may analyze an operation profile to identify any redundancies. Further, the communication adaptation logic 161 may generate a new profile of the plurality of equipment by adjustment of the settings and/or physical location of one or more equipment. Based on the available characteristics and timing information of the rest of the equipment, the communication adaptation logic 161 may simulate operation of the industrial environment 100 according to the new profile. Based on results of the simulation the communication adaptation logic 161 may apply or suggest the new profile.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A switch, comprising:
    an interface device configured to communicate with a first equipment, the communication comprising receipt of a first sensor data from the first equipment, the first equipment being part of a control group that includes a plurality of equipment, and the first sensor data being indicative of an industrial environment in which the control group is operable;
    a memory device configured to store a physical location associated with the first equipment and the plurality of equipment; and
    circuitry configured to
        detect a failure status of the first equipment;
        detect, in response to detection of the failure status of the first equipment, a second equipment in a vicinity of the first physical location;
        command the second equipment to be part of the control group, to collect second sensor data and to transmit the second sensor data to the circuitry; and
        use the second sensor data in place of the first sensor data to control operation within the control group.

2. The switch of claim 1, wherein the circuitry is configured to overlay, on a map, the physical location of the first equipment and the plurality of equipment included in the control group and also display on the map a network interconnection topology within the control group.

3. The switch of claim 1, wherein the circuitry is configured to
    determine a latency associated with transmission of data to the first equipment and the plurality of equipment included in the control group, and
    establish a performance level rating within the control group.

4. The switch of claim 3, wherein the circuitry is configured to determine the latency and a response time rating associated with receipt of data from the first equipment and the plurality of equipment included in the control group.

5. The switch of claim 4, wherein the memory device is further configured to store a spanning tree entry for the first equipment and the plurality of equipment included in the control group.

6. The switch of claim 5, wherein the spanning tree entry for the first equipment and the plurality of equipment included within the control group comprises the latency to transmit data within the control group to the first equipment and the plurality of equipment, and the latency within the control group to receive data from the first equipment and the plurality of equipment.

7. The switch of claim 6, wherein the circuitry is further configured to determine a data path to the first equipment and the plurality of equipment within the control group based on the physical location of the first equipment and the plurality of equipment.

8. The switch of claim 7, wherein the determined data path to the first equipment improves at least one of the latency to transmit data to the first equipment or the latency to receive data from the first equipment.

9. A system, comprising:
    a plurality of equipment divided into a control group, the control group comprising a first equipment;
    a supervisor node associated with the control group, the supervisor node being a second equipment among the plurality of equipment; and
    a server computer including a memory device and circuitry configured to
        communicate with the plurality of equipment via the supervisor node;
        store a profile of the plurality of equipment, the profile comprising a physical location of the equipment, settings of the equipment, components of the control group, and the association of the supervisor node with the control group;
        detect a failure status of the first equipment;
        determine, in response to detection of the failure status of the first equipment, whether a third equipment of the plurality of equipment is in a vicinity of a physical location of the first equipment; and
        display, on a display, the profile of the plurality of the equipment as an overlay of the physical location of the plurality of equipment on a map.

10. The system of claim 9, wherein the circuitry is further configured to display a rating of the plurality of equipment on the displayed profile.

11. The system of claim 10, wherein
    the supervisor node is configured to determine a data communication latency associated with a communication path between the server computer and the plurality of equipment in the control group associated with the supervisor node, and
    the circuitry is configured to display the communication path between the server computer and the plurality of equipment, and further indicate the data communication latency associated with the communication path.

12. The system of claim 11, wherein the data communication latency associated with the displayed communication path is indicated by a color scheme.

13. The system of claim 10, wherein the circuitry of the server computer is configured to reset the plurality of equipment according to a stored profile.

14. The system of claim 9, wherein
the supervisor node is configured to determine a data communication latency associated with the plurality of equipment in the control group associated with the supervisor node, the data communication latency being representative of time required for communication of data between the server computer and the plurality of equipment, and
the circuitry of the server computer is further configured to
receive, from the supervisor node, the data communication latency associated with the plurality of equipment, and
store the data communication latency in the profile of the plurality of equipment.

15. The system of claim 14, wherein the server computer is configured to
analyze the profile of the plurality of equipment,
generate a new profile of the plurality of equipment by adjustment of the settings of one or more of the plurality of equipment,
simulate operation of the plurality of equipment according to the new profile, and
apply the new profile based on results of the simulation.

16. The system of claim 14, wherein the server computer is configured to
analyze the profile of the plurality of equipment,
generate a new profile of the plurality of equipment, the new profile comprising a change in physical location of the plurality of equipment,
simulate operation of the plurality of equipment according to the new profile, and
recommend one of the profile or the new profile based on results of the simulation.

17. A product, comprising:
a non-transitory machine readable medium; and
instructions stored on the medium that when executed causes a system to:
communicate instructions from a server computer to a plurality of equipment associated in a control group, the plurality of equipment associated in the control group, and the plurality of equipment comprising a plurality of electronic devices, a control device and a plurality of sensors;
communicate data from the plurality of equipment to the server computer via the control device;
determine a latency associated with communication between each equipment of the plurality of equipment;
store a spanning tree entry for the plurality of equipment in the control group;
detect a failure status of a first equipment of the equipment associated in the control group;
determine, in response to detection of the failure status of the first equipment, whether a second equipment is in a vicinity of a physical location of the first equipment; and
command the second equipment to be part of the control group and to collect sensor data, wherein
the spanning tree entry for the equipment comprises the latency associated with communication between the plurality of equipment within the control group.

18. The product of claim 17, wherein the instructions when executed, further cause the system to:
communicate the latency associated with the plurality of equipment in the control group to the server computer; and
receive, from the server computer, instructions to communicate with the second equipment instead of the first equipment.

19. The product of claim 17, wherein the instructions when executed, further cause the system to:
send a request to the server computer to register the second equipment as being included in the control group; and
send a further request to the server computer to use the second equipment instead of the first equipment to perform a predetermined control related function within the control group.

20. The product of claim 17, wherein the instructions when executed, further cause the system to:
display, on a display, the spanning tree entry.

* * * * *